Dec. 2, 1969 H. ISSTAS 3,481,313
INTERNAL COMBUSTION ENGINE WITH CIRCULAR RING PISTONS
Filed Dec. 5, 1967 10 Sheets-Sheet 1

Inventor:
HANS ISSTAS

ATTORNEY

Dec. 2, 1969          H. ISSTAS          3,481,313

INTERNAL COMBUSTION ENGINE WITH CIRCULAR RING PISTONS

Filed Dec. 5, 1967          10 Sheets-Sheet 3

Fig. 5

Inventor:
HANS ISSTAS

Robert W. Beach

ATTORNEY

United States Patent Office 3,481,313
Patented Dec. 2, 1969

3,481,313
INTERNAL COMBUSTION ENGINE WITH CIRCULAR RING PISTONS
Hans Isstas, Markusberg 24 C, Trier, Germany
Filed Dec. 5, 1967, Ser. No. 688,092
Claims priority, application Germany, Dec. 6, 1966, J 32,412
Int. Cl. F01c 1/30
U.S. Cl. 123—13                9 Claims

ABSTRACT OF THE DISCLOSURE

Flexible arcuate working pistons connected to the periphery of a rotative disk travel circumferentially through an annular working cylinder to rotate a drive shaft connected to the disk and extending perpendicular to it. Arcuate control pistons travel circumferentially in an annular control cylinder about an axis intersecting the shaft axis at an acute angle. The working cylinder and the control cylinder are of the same diameter so that they intersect at diametrically opposite locations. Ring gears rotative with the working pistons and the control pistons, respectively, are interconnected by connecting pinions and shaft mechanism to synchronize the speed of rotation of the working pistons and the control pistons. Intake and exhaust slots in the annular cylinders can be altered in size by adjustment of flap valves to enable the direction of rotation of the pistons in their cylinders to be reversed.

---

Besides internal combustion engines having pistons moved up and down engines provided with rotating pistons are also known. The invention has as its object the increasing of the engine efficiency, life and operating reliability of these known piston engines and in doing so saving considerable energy and making the engine with a lower specific weight.

To make the assembly of several identical units is very advantageous in order thereby to provide a more economical construction by standardization.

By simply alternating the suction and outlet ports with reversal of the starting direction of rotation of the engine can be made to run forward or reverse. Thereby reversing gears could be dispensed with. By varying the ratio between the diameter of the pistons and the diameter of the piston ring almost any desired increase of the bore and length of piston travel path, corresponding to the stroke associated with conventional reciprocating piston engines, can be obtained. With every rotation two pistons produce two working strokes each of which rotations corresponds to a 4 cylinder, two stroke or an 8 cylinder four stroke engine.

Further details of the invention can be seen from the accompanying drawings of preferred embodiments given by way of example. In the drawings.

Figure 1:
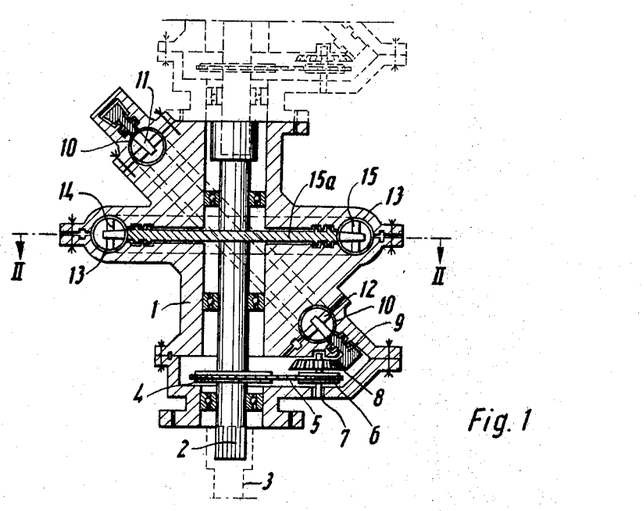
FIG. 1 shows in section one apparatus according to the invention.

The internal combustion engine according to the invention shown in FIG. 1, consists of an engine block 1 and an axle stub 2 mounted in bearings which is capable of being connected to a driving shaft 3 only indicated in broken lines.

On the shaft stub 2 is located a sprocket 4 which is connected by a chain 5 to a sprocket 6. The sprocket 6 is located on an axle 7 which carries a bevel gear 8. This bevel gear 8 cooperates with a ring gear 9 which is disposed on the periphery of an annular cylinder 10. In the cylinder 10, which serves as a control cylinder, are located two circular ring pistons 11 and 12 which have made the control cylinder always in the same direction and are connected to the ring gear 9.

In the engine block 1 there is furthermore disposed a second annular cylinder 13 which is formed as a working cylinder and is at an angle to the control cylinder 10 whereby the control cylinder and working cylinder cross at two opposite places. Two ring pistons 14 and 15 which are connected by a wheel disc 15a to the shaft 2 likewise run inside the working cylinder 13.

Figure 2:
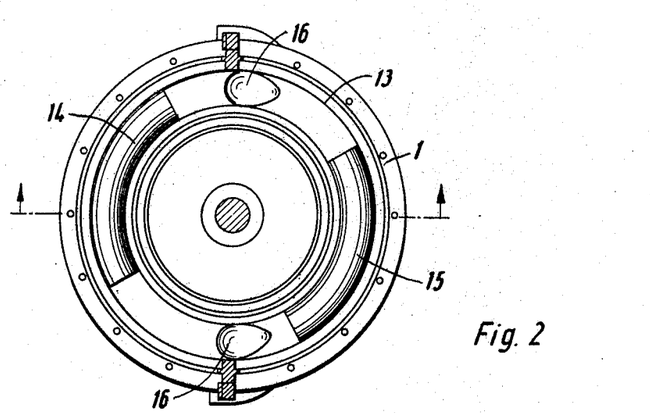
FIG. 2 is a section on line II—II of FIG. 1.

In FIG. 2 can be clearly seen the working cylinder 13 with its two ring pistons 14 and 15 and the openings at the crossing places are indicated at 16. The embodiment according to FIGS. 3 and 4 differ only in that the connection of working and control pistons is effected by means of two toothed pinions 17 and 18 connected to one another which run suitably on one ring gear 19 of the working cylinder and the ring gear 20 of the control cylinder, respectively.

Figure 3:
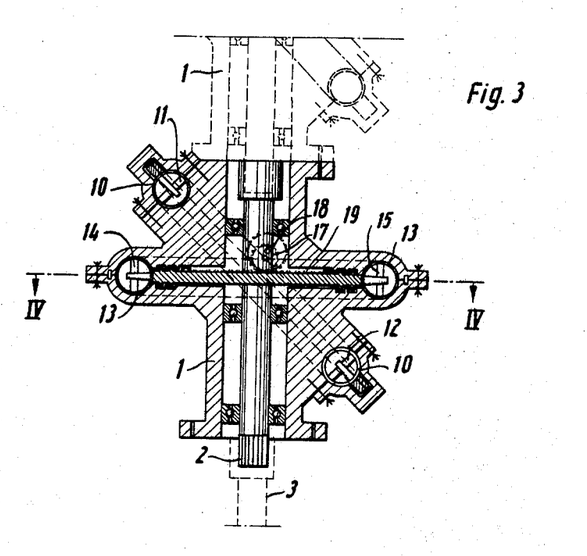
FIG. 3 shows a section corresponding to FIG. 1 but with other transmission means between the control and working ring pistons.
Figure 4:
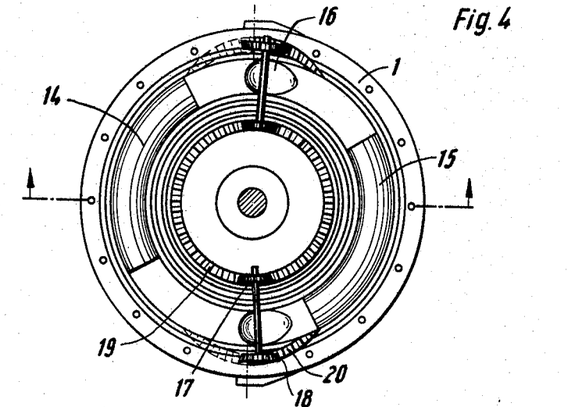
FIG. 4 is a section on line IV—IV of FIG. 3.

The embodiments shown in FIGS. 1 and 3 can be extended by adding similar units in series, connected to the same draft shaft, such as those indicated in broken lines.

Figure 5:
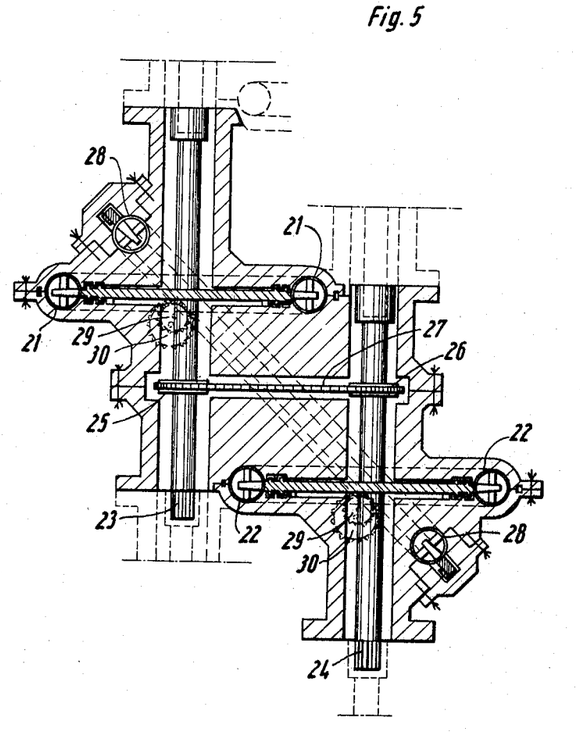
FIG. 5 shows another embodiment with two working cylinders with two pistons each and a larger control cylinder ring with four pistons which are connected as a unit.

In the embodiment according to FIG. 5 two working cylinders 21 and 22 are provided the shafts 23 and 24 of which are connected to one another by sprockets 25 and 26 joined by a transmission chain 27. Both working cylinders 21 and 22 are crossed by a common control cylinder 28 which in this case has four circular ring pistons whilst each working cylinder, as in the preceding examples, is provided with two pistons. Here again double pinions 29 and 30 are provided for synchronizing the rotation of the working and control pistons.

In this embodiment also in a similar manner further working and control cylinders can be added to the unit shown whereby the output of the engine will be correspondingly increased.

The circular ring piston utilized for the internal combustion engine according to the invention is constructed advantageously as a "flexible" piston divided into several members as can be seen in FIGS. 6 to 11.

The piston 66 consists of a front part 67, a centre part 68 and a rear part 69. Around the piston are disposed several piston rings 70 in suitable recesses and spaced apart from one another which have sealing engagement with the cylinder wall. The centre part 68 of the piston is divided into three segments 71, 72 and 73 as FIGS. 7 to 9 show. These segments are held together elastically by springs 74 and sealing plates 74a. Inside the piston there is located a continuous torsion rigid and longitudinally tensioned core 75 which is disposed in an annular hollow 76 of square cross section. The hollow 76 has a transtion space extending downwards and outwards to the circular piston wheel disc 15a (FIG. 1). Extending outwardly from the cavity of square cross section are side parts 78 to balance the rotative assembly dynamically. In this way dynamic compensation of weight between the piston segments is attained so that the centrifugal force produced by the rotating piston segments is equalized.

Figure 6:
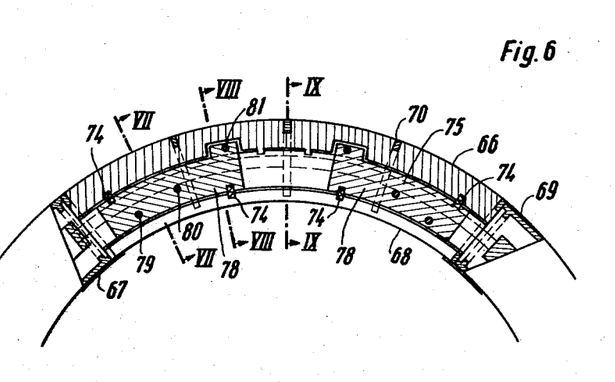
FIG. 6 shows the principle of a "flexible" circular ring piston in section.
Figures 7, 8, 9:
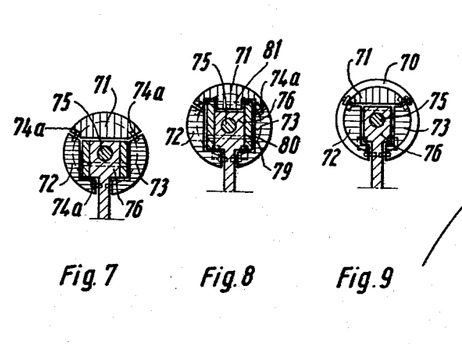
FIG. 7 is a section on line VII—VII of FIG. 6.
FIG. 8 is a section on line VIII—VIII of FIG. 6.
FIG. 9 is a section on line IX—IX of FIG. 6.

The hinge-pins 79, 80 and 81 connect the segments to the balance beam and the circular ring or circular wheel disc as shown in FIGURE 6.

Figure 10:
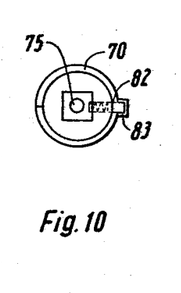
FIG. 10 shows a plan of the circular ring piston from the front.
Figure 11:
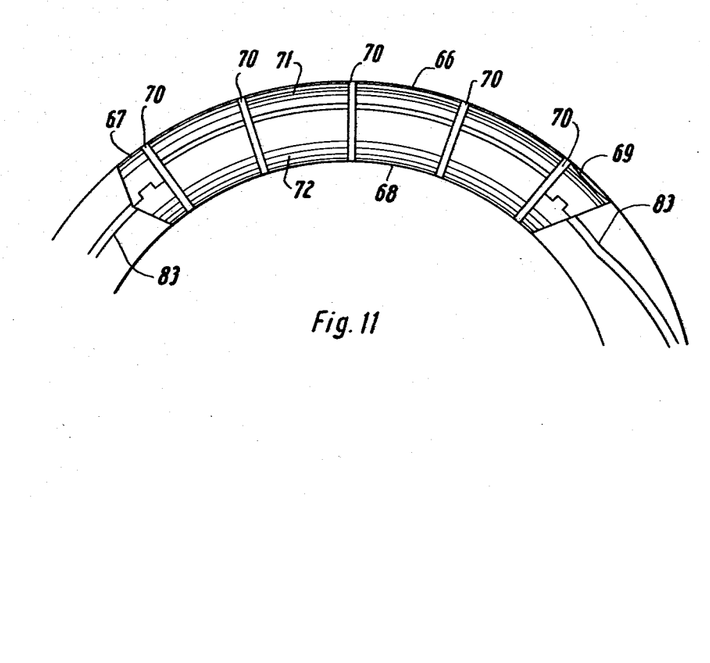
FIG. 11 shows a front view of the circular ring piston.

On the forward part and rear part 68 and 69 respectively are disposed spring loaded guide cams 82 shown in FIGURE 10 which engage in a groove 83 of the cylinder wall in order to guide only the end parts and to give them a rotation with this common core during the running. In order to achieve a particularly satisfactory sealing between the piston and cylinder the surface of the tightly connecting piston may be slightly burled which at the same time permits better oil film guiding. The supply of oil may be effected by means of bores through the wheel disc to the circular ring piston.

Figure 12:
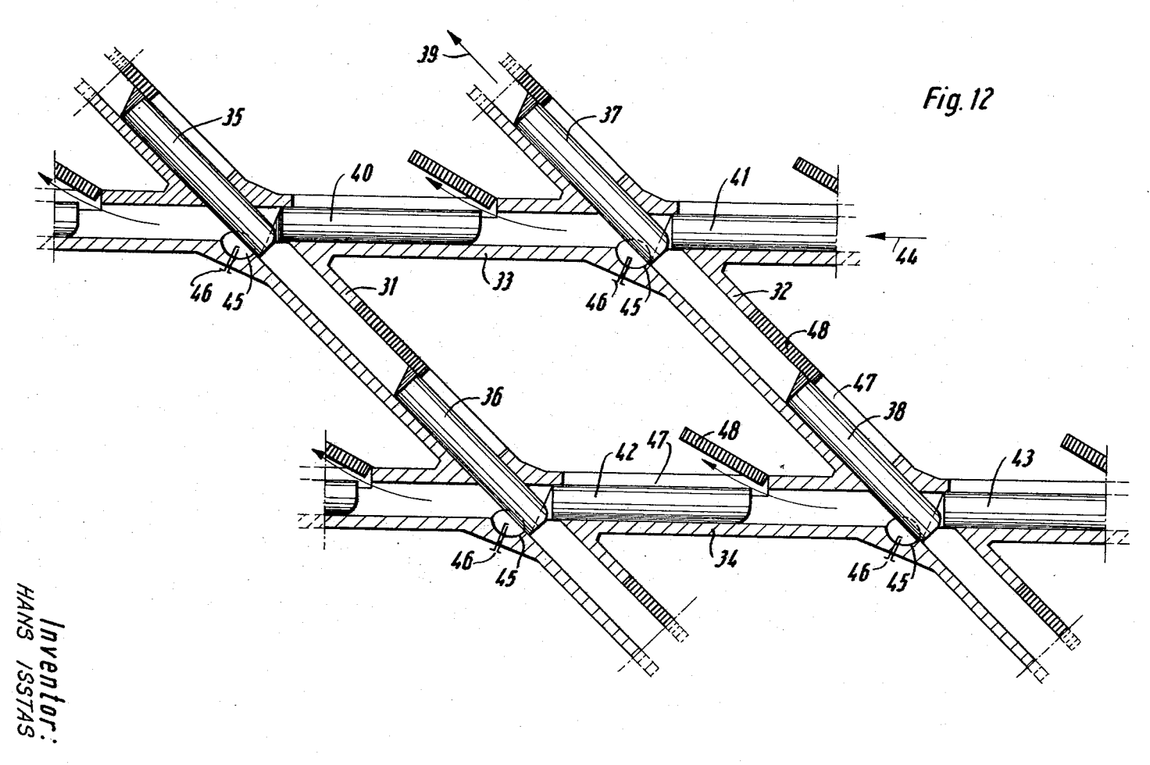
FIG. 12 shows a diagrammatic disposition of the piston at the beginning of the exhaust and end of the suction.
Figure 13:
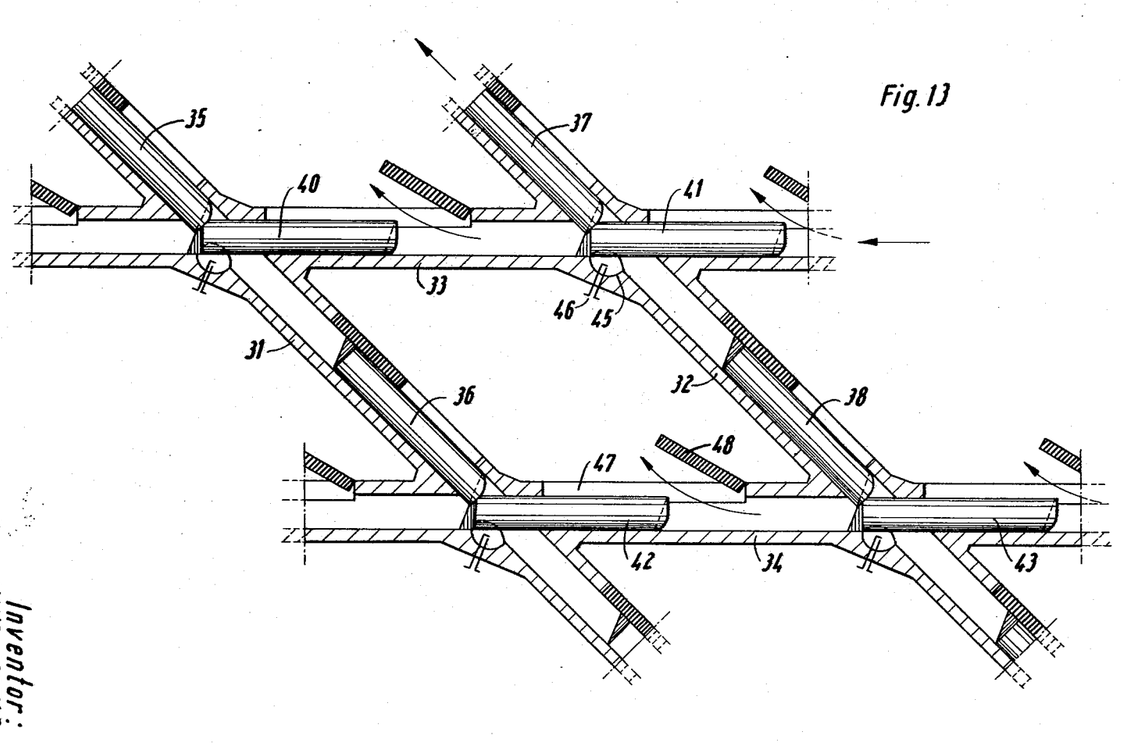
FIG. 13 shows the diagrammatic position of the piston at the beginning of the compression.

In FIGS. 12 and 13 there is shown diagrammatically a machine with two control cylinders 31 and 32 as well as two working cylinders 33 and 34 crossing the control cylinders. The direction of movement of the two control pistons 35 and 36 or 37 and 38 is indicated by arrows 39 and the direction of movement of the two working pistons 40, 41 and 42, 43 is indicated by the arrows 44. At the crossing places between the control cylinders and the working cylinders there is located a compression space 45 with an ignition plug and an injection nozzle 46. In the wall of the control cylinder and working cylinder, slit openings 47 are provided which can be selectively enlarged with the aid of slit widening flap valves 48 in order thereby to obtain with forward and reverse running the most favourable degree of efficiency.

FIG. 12 shows the engine with forward running of the pistons in the state in which the compression occurs ahead of the control pistons 35, 36, 37, 38 and in which the expelling of the gasses commences behind the working pistons 40, 41, 42 and 43.

FIG. 13 shows a representation similar to FIG. 12 wherein, however, the pistons have moved a little farther so that the control piston is still producing compression shortly before the suction stops whilst the working pistons are still expelling the burned gases.

Figure 14:
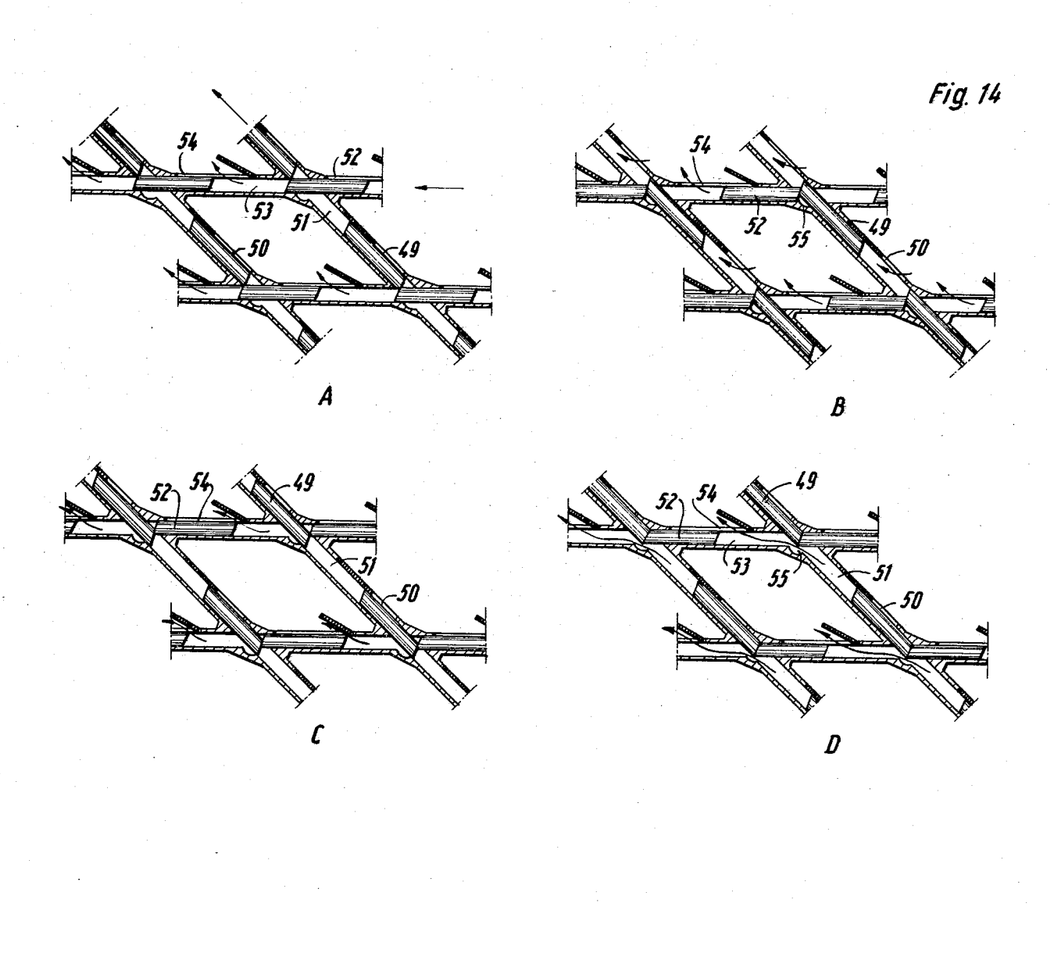
FIG. 14 shows diagrammatically different positions of the piston upon forward running using variation valves for the variation of the sizes of the slits.

Successive stages of the operation during forward running of the pistons can be seen from the sketches A to D of FIG. 14. In the position A the control pistons 49 close the suction openings 50 and seal the space 51 in front of them. The working pistons 52 press the gases in the space 53 head of them outward through the exhaust ports 54. In the position B the control pistons 49 have uncovered the suction port 50 so that the air is drawn into the cylinder in the direction of the arrow behind the control piston. The compression phase is terminated and the explosion takes place between the control piston 49 and working piston 52 in the compression chamber 55. The gases of the previous explosion are expelled ahead of the working piston through the exhaust openings 54 in the direction of the arrow.

In the position C the control pistons 49 have again closed the suction ports 50 so that the compression by the two control pistons in the chambers 51 can start. The gases formed in the compression chamber 55 upon explosion with the parts in position B can pass outwards now through the exhaust opening 54 as have the burning gases pushed the working pistons 52 farther forward.

In the position D the gases compressed in the chamber 51 ahead of the control piston 49 are used for a short time for scavenging the combustion chamber so that they can pass through the open compression chamber 55 into the chamber behind the working piston 52 from where they are discharged through the exhaust openings 54. This scavenging air in addition produces a cooling effect.

Figure 15:
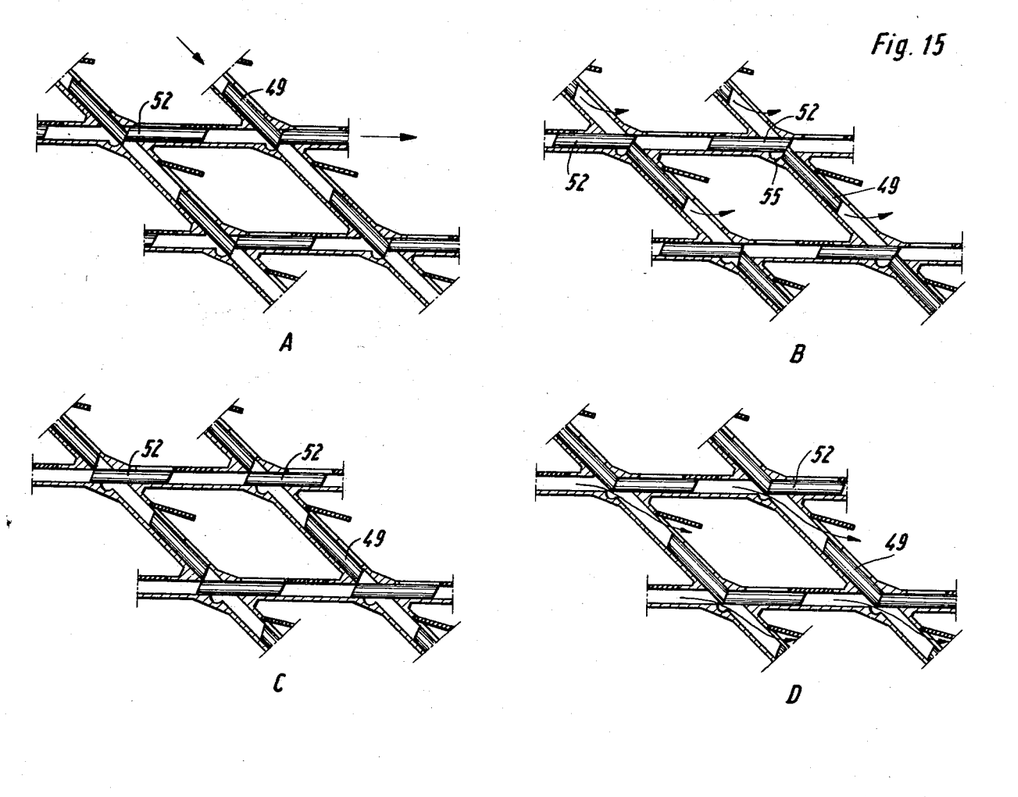
FIG. 15 shows diagrammatically different positions of the pistons like FIG. 14 but upon reverse running.

Sketches A to D of FIGURE 15 illustrate the different positions upon reverse running of the pistons. During such operation care is to be taken that the previous exhaust openings in the working cylinder are made smaller by closing of the flap valves and the previous suction openings in the control cylinders are made larger by opening of the flap valves. This is necessary as the suction and exhaust slits as well as the working and control pistons alternate their functions so that the previous suction openings become exhaust openings and the previous control pistons become working pistons.

For clarity's sake the corresponding reference numbers for the individual parts are retained as they have been selected in FIG. 14. According to this the position A shows the position in which compression is ahead of the working pistons 52 and the exhaust is before the control piston 49. In the position B the explosion and expansion recess behind the control piston 49 in the compression chamber 55 whilst the gases are expelled before the control pistons.

In the position C the expansion is terminated and the expelling of the gases commences behind the control piston 49. The expelling of the gases is just terminated ahead of the control pistons whilst the compression commences ahead of the working pistons 52. In the position D scavenging is done behind the control pistons 49.

Figure 16:
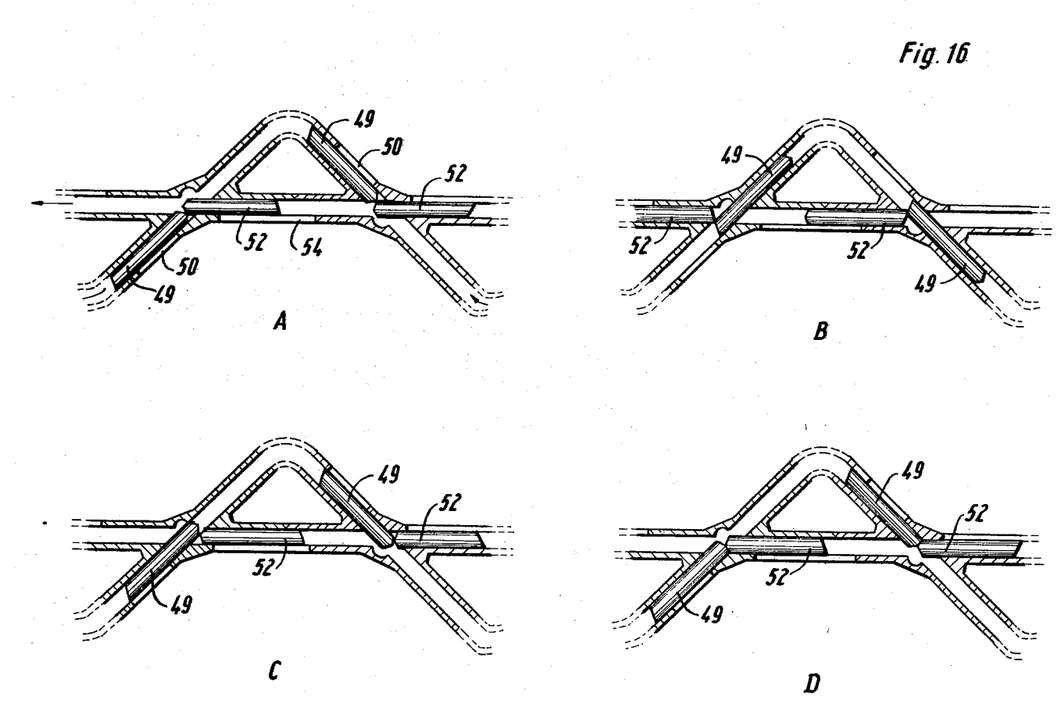
FIG. 16 shows diagrammatically different positions of the circular ring pistons according to FIGS. 1 and 3.

Whilst with reference to the diagrammatic sketches of FIGS. 12 to 15 the individual positions of the working and control pistons upon forward and reverse running have been explained it must be mentioned that in reality the control pistons do not describe a straight path as shown in these figures, but actually their path is semicircular as indicated in FIG. 16. FIG. 16 shows further that by this course the cooperation of working and control pistons varies at the crossing places. It is therefore necessary to impart to the front ends of the pistons during their course a movement of rotation as already explained with reference to FIGS. 6 to 11. This applies in particular when the end faces of the pistons are bevelled on one side at the front and rear for better tight sealing.

FIG. 16 shows the same piston positions as explained with reference to FIG. 14. In position A the control piston 49 hold the suction openings 50 closed and, the working pistons 52 press the gases outwards through the exhaust openings 54. In position B the control pistons 49 have uncovered the suction openings, the compression procedure is terminated and the explosion takes place. During movement from position A to position B the front ends of the pistons have rotated 180°. Position C shows commencement of the compression. Position D illustrates scavenging of the compressed gases and commencement of a renewed rotation of the front ends of the piston.

In order to be able to allow the pistons to run forward and backwards within the cylinders of the engines without having to alter the apparatus very much, but on the other hand to obtain always a good degree of efficiency, the openings disposed in the wall of the cylinder are provided with adjustable flap valves 48 which render the size of the suction and exhaust openings variable. The manner of operation of such an arrangement of flap valves can be seen in more detail in FIGS. 17 and 18.

Figures 17, 18:
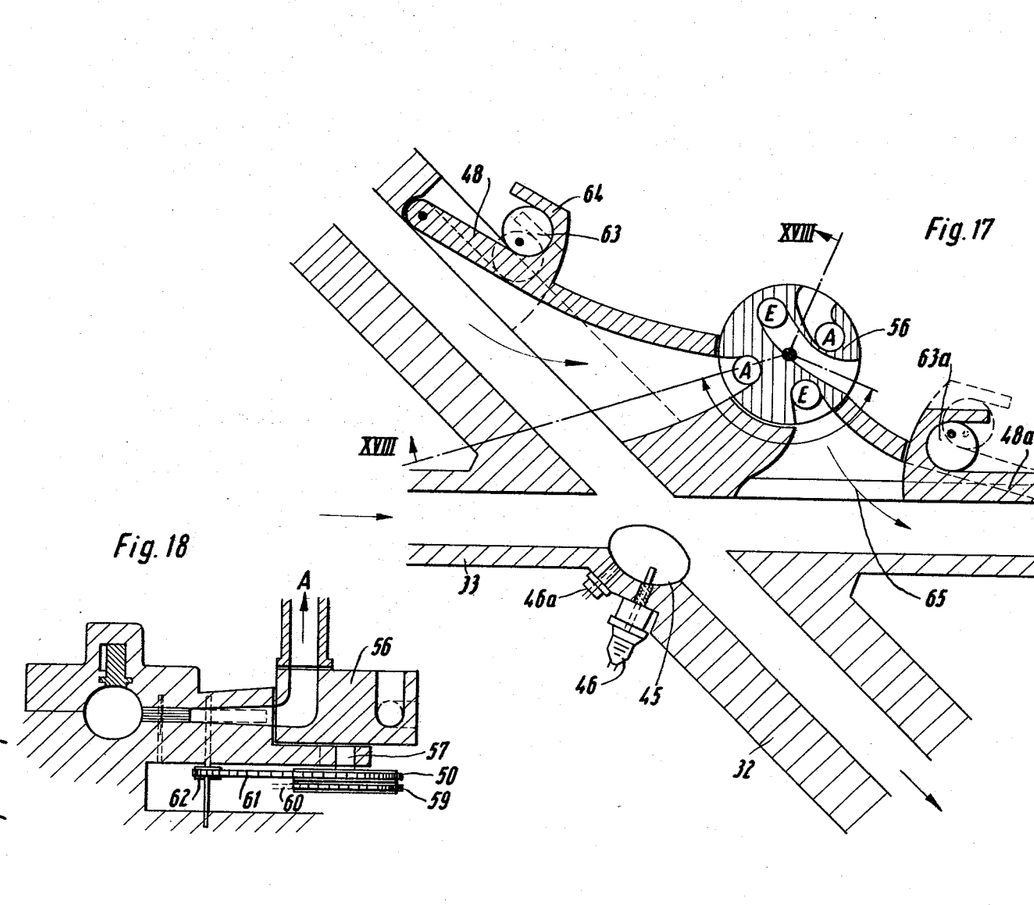
FIG. 17 shows on an enlarged scale a ring piston crossing place with flap valve mechanism for varying the size of the suction and exhaust slit as well as an annular slide valve for alternating the suction and outlet port for forward and reverse running.
FIG. 18 is a diagrammatic section on line XVIII—XVIII of FIG. 17.

Near the crossing place of the control cylinder 32 and of the working cylinder 33 opposite the compression chamber 45 with ignition plug 46 and injection nozzle 46a is located a rotary valve 56 having two outlet openings A and two inlet openings E. This valve 56 is mounted on a journal 57 which carries sprockets 58 and 59. Whilst the sprocket 59 is connected by a transmission chain 60 to a drive not shown the sprocket 58 is connected by transmission chain 61 to a sprocket 62 which in its turn is connected to an eccentric disc 63. The eccentric disc fits in a carrier 64 which is mounted on the flap valve 48.

If the position shown in FIG. 17 upon reverse running is changed to forward running by rotation of the rotary slide valve by about 150° then the outlet openings E and the outlet openings A interchange. At the same time, by operation of the drive illustrated in FIG. 18, the valve 48 is closed by the eccentric 63 and the flap valve 48a is opened by the eccentric 63a.

Of course it would also be feasible to provide hydraulic or pneumatic valve-controlling mechanism, instead of a mechanical drive with chain or rod transmission, to effect alternate closing and opening of the flap valves 48 in reversing the direction of piston rotation.

It is considered as particularly advantageous that the engine according to the invention provides large torque at low speeds so that less speed reduction in the transmission is required. By means of the circular ring or toroidal shape of cylinder the length of piston stroke can be substantially increased which results in a better utilization of the explosion pressure and effects a substantial saving of energy. The number of movable parts is small so that their life is increased and the maintenance costs are also low as the individual parts required are of simple form and due to the unit assembly system they can be assembled without alteration for different power requirements.

As already mentioned it is possible to reverse the direction of rotation by changing the starting direction of rotation and thereby altering the coupled injection and ignition and correspondingly changing the size of the suction and exhaust openings as previously explained.

The engine may be provided with or without valves. Carburator as well as injection pumps may also be used. It is also possible to allow the engine to run as a multiple fuel engine. The inner cooling may be facilitated by fresh air.

For the sealing between pistons and cylinders either piston rings or cylinder rings are provided. It is particularly advantageous to use flexible pistons to improve sealing.

What I claim is:

1. An internal combustion piston engine comprising at least two annular cylinder connected to one another at an acute angle and crossing each other, pistons received in said two cylinders, respectively, and means connecting a piston in one of said cylinders and a piston in the other of said cylinders to effect conjoint rotation thereof in their respective cylinders.

2. The internal combustion piston engine defined in claim 1, one of the cylinders having an opening in the wall thereof usable interchangeably for supply of air to such cylinder and for discharge of exhaust gas from such cylinder depending on the direction of rotation of a piston in such cylinder.

3. The internal combustion piston engine defined in claim 2, the cylinder wall opening being a slit extending circumferentially of the cylinder, and a flap valve disposed to cover at least a portion of said slit and being adjustable to alter the extent of said slit covered by said flap valve.

4. The internal combustion piston engine defined in claim 1, in which one of the cylinders is a working cylinder and the other cylinder is a control cylinder which cooperate to form a driving unit.

5. The internal combustion piston engine defined in claim 1, in which a piston is rotatable circumferentially of its cylinder selectively in one direction or in the opposite direction.

6. The internal combustion piston engine defined in claim 1, in which the pistons are arcuate and flexible.

7. The internal combustion piston engine defined in claim 6, in which each of the arcuate pistons includes a plurality of sections flexibly connected together.

8. The internal combustion piston engine defined in claim 7, an arcuate piston including a core separate from and extending through adjacent piston sections.

9. The internal combustion piston engine defined in claim 7, in which a piston section has a guide projection, and the cylinder wall has a groove in which said guide projection is engaged.

References Cited

UNITED STATES PATENTS

| | | |
|---|---|---|
| 822,952 | 6/1906 | Jewell. |
| 2,679,352 | 5/1954 | Vance _______________ 230—137 |
| 2,718,351 | 9/1955 | Kirkpatrick _________ 230—137 |
| 3,220,387 | 11/1965 | Creager. |

FOREIGN PATENTS

| | | |
|---|---|---|
| 1,289,768 | 2/1962 | France. |

C. J. HUSAR, Primary Examiner

U.S. Cl. X.R.
103—117, 127